US007793689B2

(12) United States Patent
Becker

(10) Patent No.: US 7,793,689 B2
(45) Date of Patent: Sep. 14, 2010

(54) MULTILAYER HEAT TRACING INSULATION DEVICE AND METHOD

(75) Inventor: Paul Becker, San Carlos, CA (US)

(73) Assignee: Tyco Thermal Controls LLC, Menlo Park, CA (US)

( * ) Notice: Subject to any disclaimer, the term of this patent is extended or adjusted under 35 U.S.C. 154(b) by 0 days.

(21) Appl. No.: 12/395,645

(22) Filed: Feb. 28, 2009

(65) Prior Publication Data

US 2009/0217999 A1 Sep. 3, 2009

Related U.S. Application Data

(60) Provisional application No. 61/032,771, filed on Feb. 29, 2008.

(51) Int. Cl.
*F16L 9/14* (2006.01)

(52) U.S. Cl. ........................ 138/149; 138/140; 138/137; 219/535

(58) Field of Classification Search ................. 138/149, 138/137, 141, 140; 219/535, 530
See application file for complete search history.

(56) References Cited

U.S. PATENT DOCUMENTS

| | | | | | |
|---|---|---|---|---|---|
| 3,522,413 | A | * | 8/1970 | Chrow | 392/468 |
| 3,548,158 | A | * | 12/1970 | McCaskill | 219/530 |
| 3,552,445 | A | * | 1/1971 | Andrews | 138/144 |
| 3,665,968 | A | * | 5/1972 | De Putter | 138/141 |
| 3,727,029 | A | * | 4/1973 | Chrow | 392/468 |
| 3,782,452 | A | * | 1/1974 | Ceplon | 165/135 |
| 3,955,601 | A | | 5/1976 | Plummer, III | |
| 3,971,416 | A | * | 7/1976 | Johnson | 138/33 |
| 4,031,611 | A | * | 6/1977 | Johnson, Jr. | 29/611 |
| 4,203,186 | A | * | 5/1980 | Horner | 29/890.045 |
| 4,287,245 | A | * | 9/1981 | Kikuchi | 428/34.2 |
| 4,334,142 | A | * | 6/1982 | Blackmore | 392/469 |
| 6,403,180 | B1 | | 6/2002 | Barrall | |
| 6,935,376 | B1 | | 8/2005 | Taylor et al. | |
| 2003/0213525 | A1 | | 11/2003 | Patel et al. | |
| 2005/0274713 | A1 | * | 12/2005 | Malone et al. | 219/535 |
| 2006/0060256 | A1 | | 3/2006 | Keyes | |
| 2006/0272727 | A1 | * | 12/2006 | Dinon et al. | 138/149 |

FOREIGN PATENT DOCUMENTS

| | | |
|---|---|---|
| GB | 2084284 | 4/1982 |

* cited by examiner

*Primary Examiner*—Patrick F Brinson

(57) ABSTRACT

A heat tracing device has one or more heating elements positioned adjacent to a heatable surface, an aerogel high temperature insulation layer adjacent to the one or more heating elements, a low temperature insulation layer adjacent to the aerogel high temperature insulation layer and a locking mechanism effective to fix the position of the low temperature insulation layer to the aerogel high temperature insulation layer.

13 Claims, 1 Drawing Sheet

MULTILAYER HEAT TRACING INSULATION DEVICE AND METHOD

BACKGROUND

This application claims the benefit of U.S. Provisional Application Ser. No. 61/032,771 filed Feb. 29, 2008.

The present disclosure relates generally to heat tracing and insulation.

SUMMARY OF THE PRESENT INVENTION

The present invention includes a heat tracing device having one or more heating elements positioned adjacent to a heatable surface, an aerogel high temperature insulation layer adjacent to the one or more heating elements, a low temperature insulation layer adjacent to the aerogel high temperature insulation layer and a locking mechanism effective to fix the position of the low temperature insulation layer to the aerogel high temperature insulation layer.

The present invention also includes a heat tracing device having one or more heating elements in combination with an aerogel insulation layer.

DETAILED DESCRIPTION OF THE PREFERRED EMBODIMENT

Figure 1:
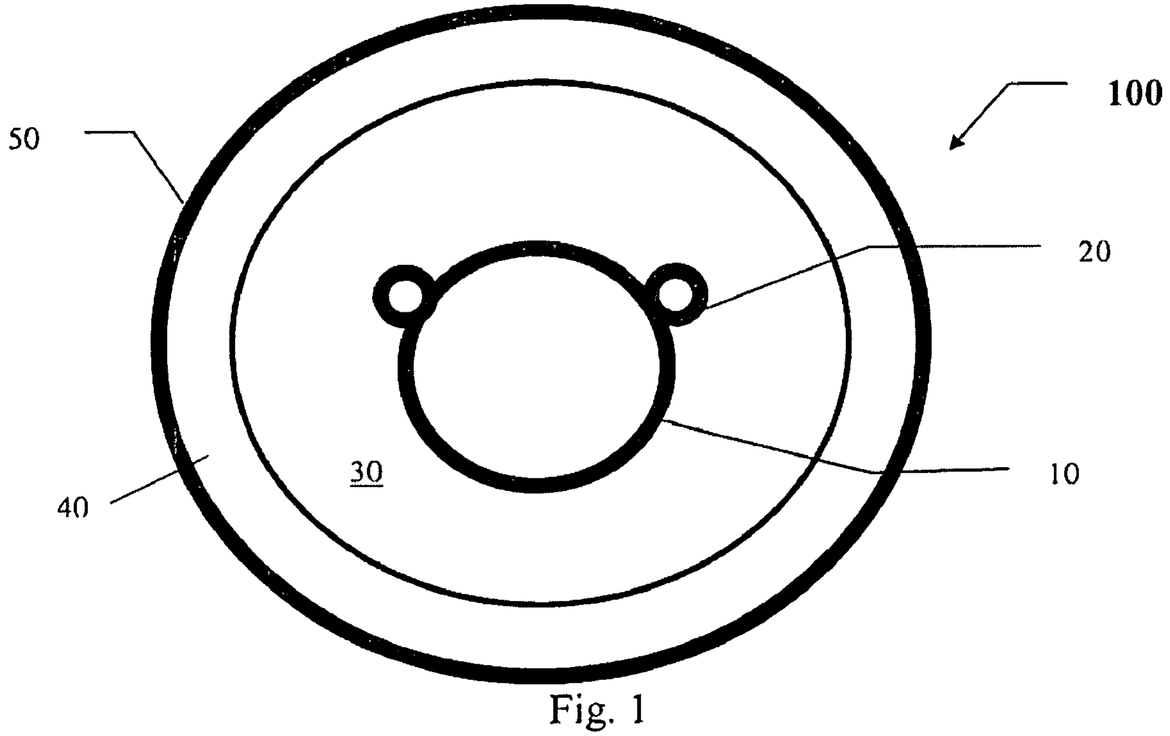
FIG. 1 is an illustration showing a cross section of insulated pipe with heat tracing representing the present invention.

The present invention includes a device, and method of manufacture, for heat tracing.

Referring to FIG. 1, the present invention includes a heat tracing device 100 having one or more heating elements 20 positioned adjacent to a heatable surface 10. Containing the one or more heating elements 20 is an aerogel high temperature insulation layer 30 located adjacent to the one or more heating elements 20. A low temperature insulation layer 40 is located adjacent to the aerogel high temperature insulation layer 30, overlapping or encompassing the aerogel high temperature layer 30. Additional insulation layers may be included. Outside and containing the insulation layers 30 and 40 an outer restrictive casing 50 may be used.

The heatable surface may include any appropriated surface suitable for trace heating, such as surfaces and conduit. Surfaces may include floors, containers, bridges, wall panels and the like. Conduits may include tubes, pipes and other like passages for fluid and gaseous flow. For piping systems, the present invention is preferably used for applications of freeze protection and process temperature maintenance.

The heat heating elements 20 of the present invention may include one or more heat tracing tubes and/or heat tracing cables, e.g., cables may be inside the tubes or directly attached to the pipe, or other heat transfer mechanism for imparting heat into an adjacent surface. For example, heating cables may include those heating cables sold by Tyco Thermal Controls LLC of Menlo Park, Calif., such as self regulating cable commercially sold under the RAYCHEM trademark, mineral insulated cables commercially sold under the PYROTENAX trademark, power limiting cables commercially known as VPL™ power limiting cables, series resistance heating cables commercially known as CPD™ series resistance heating cables, skin effect tracing system commercially known as STS™ tracing, and other similar heating cables.

The heat tracing device 10 includes an aerogel high temperature insulation layer 30 located adjacent to the heating elements 20 and surface 10. This aerogel high temperature insulation layer 30 is preferably rated above 120° C. continuous, and having a thickness sufficient that the temperature of the outer surface of the aerogel high temperature insulation layer 30 remains less than about 175° C., more preferably 150° C. and most preferably 120° C. in an actual application. Preferably the aerogel high temperature insulation layer 30 comprises an aerogel composition, such as metal oxide aerogels or ceramic aerogels, e.g., silica gels. In one alternative embodiment, the aerogel high temperature insulation layer 30 includes a higher temperature inner layer conventionally known insulation material. Representative conventional pipe insulation materials include, for example without limitation, expanded Perlite having about 500° C. rating, calcium silicate having about 650° C. and foamglass having about 480° C. Aerogels within the present invention provide an advantage of having a relatively thin layer of insulation material relative to the amount of insulation required of conventional insulation to achieve similar performance. Representative reductions in thickness by using aerogel layers include for example, without limitation, about 50% thickness.

Generally, the manufacture and production of aerogels are known, such as that disclosed in U.S. Pat. No. 4,221,672 to McWilliams, entitled "Thermal insulation containing silica aerogel and alumina"; U.S. Pat. No. 5,420,168 to Mayer, et. al., entitled "Method of low pressure and/or evaporative drying of aerogel"; U.S. Pat. No. 5,508,341 to Mayer, et al., entitled "Organic aerogel microspheres and fabrication method therefor"; U.S. Pat. No. 5,569,513 to Fidler et al, entitled "Aerogel-in-foam thermal insulation and its preparation"; U.S. Pat. No. 5,731,360 to Pekala, et al., entitled "Compression molding of aerogel microspheres"; U.S. Pat. No. 5,908,896 to Mayer et al., entitled "Organic aerogel microspheres"; U.S. Pat. No. 5,973,015 to Coronado et al., entitled "Flexible aerogel composite for mechanical stability and process of fabrication"; U.S. Pat. No. 6,068,882 to Ryu, entitled "Flexible aerogel superinsulation and its manufacture"; U.S. Pat. No. 6,087,407 to Coronado et al., entitled "Flexible aerogel composite for mechanical stability and process of fabrication"; U.S. Pat. No. 6,136,216 to Fidler et al., entitled "Aerogel-in-foam insulation and its preparation"; U.S. Pat. No. 6,598,283 B2 to Rouanet et al., entitled "Method of preparing aerogel-containing insulation article"; U.S. Pat. No. 6,770,584 B2 to Barney et al., entitled "Hybrid aerogel rigid ceramic fiber insulation and method of producing same". High temperature, e.g., from about 120° C. to about 250° C., aerogels are known in the art. Use of these high temperature aerogels for pipe exceeding a specific rated temperature aerogel typically has an inner layer of higher rated temperature insulation layer (ultra-high temperature insulation) adjacent to the pipe.

The low temperature insulation layer 40 may include any appropriate insulation material having a lower rating than the aerogel high temperature insulation layer 30. Preferably, the low temperature insulation layer 40 includes a foamed polymeric resin typically comprising polyurethane (PUR) and/or polyisocyanurate (PIR) foam. Other commercial foamed resin systems with lower temperature ratings may be used, such as polystyrene, urea-formaldehyde and phenolic, each having a maximum continuous temperature rating lower than PUR (such as about 150° C.).

The present invention preferably includes a locking mechanism 50. Representative locking mechanisms 50 include for example, mechanical or chemical restraining and/or adhering means, capable of securing the aerogel high temperature layer 30 and low temperature layer 40 to remain in a relatively fixed position to each other. Most preferably, the locking mechanism fixes the position of the surface, insulation layers and an outer casing together. Representative mechanical locking mechanisms, includes for example, outer casings such as metal cladding. In one preferred embodiment, the insulation layers 30 and 40 are locked to the inner pipe 10 and outer cladding 50 effective to prevent the inner pipe and outer cladding from moving independently of each other once installed. As such, the heat tracing device is capable of transmitting longitudinal forces between the inner pipe and outer cladding. Bonding preferably occurs between all insulation layers.

EXAMPLE 1

A MI heat tracing cable is positioned adjacent to a 3" O.D. steel pipe. On the outside of the pipe, a 1" aerogel high temperature insulation layer is positioned over the MI heat tracing cable. A low temperature insulation layer of PIR, 1" thick is located over and adjacent to the aerogel high temperature insulation layer. An outer restrictive casing of aluminum cladding is placed and tightened over the low temperature insulation layer to fix the two insulation layers in place over the pipe.

EXAMPLE 2

A XTV heat tracing cable is positioned adjacent to a 4" O.D. bronze pipe. On the outside of the pipe, a ½ inch aerogel high temperature insulation layer is positioned over the XTV heat tracing cable. A low temperature insulation layer of PUR, 1" thick is located over and adjacent to the aerogel high temperature insulation layer. Steel metal cladding is wrapped over the low temperature insulation layer to fix the two insulation layers in place over the pipe.

The present invention is particularly useful in pipe systems used for oil recovery and transport, process temperature maintenance, freeze protection, and the like.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A heat tracing device, comprising:
- one or more heating elements positioned adjacent to a heatable surface;
- an aerogel high temperature insulation layer adjacent to the one or more heating elements;
- a low temperature insulation layer adjacent to the aerogel high temperature insulation layer; and
- a locking mechanism disposed over said low temperature layer, said locking mechanism configured to fix the position of said low temperature insulation layer and the aerogel high temperature insulation layer with respect to said heatable surface.

2. The heat tracing device of claim 1, wherein the heatable surface is the surface of a conduit.

3. The heat tracing device of claim 1, wherein the heating element comprises one or more heat tracing tube.

4. The heat tracing device of claim 1, wherein the heating element comprises one or more heat tracing cables.

5. The heat tracing device of claim 2, wherein the conduit is a pipe.

6. The heat tracing device of claim 1, wherein the low temperature insulation layer comprises an insulating foam selected from the group consisting of polyurethane foam, polyisocyanurate foam, and combinations thereof.

7. The heat tracing device of claim 1, wherein the locking mechanism comprises a metal cladding.

8. The heat tracing device of claim 5, wherein the locking mechanism is configured to lock the aerogel high temperature insulation layer and low temperature insulation layer to the pipe such that said pipe and said locking mechanism remain in a relatively fixed position to each other.

9. The heat tracing device of claim 1, wherein the locking mechanism comprises an outer restrictive casing.

10. The heat tracing device of claim 9, wherein the locking mechanism further fixes the position of the heatable surface, insulation layers and outer restrictive casing relative to each other.

11. A heat tracing device comprising one or more heating elements in combination with an aerogel insulation layer.

12. A heat tracing device, comprising:
- one or more heating elements positioned adjacent to a heatable surface;
- an ultra-high temperature insulation layer adjacent to the one or more heating elements
- an aerogel high temperature insulation layer adjacent to the ultra-high temperature insulation layer; and,
- a low temperature insulation layer adjacent to the aerogel high temperature insulation layer.

13. A heat tracing device, comprising:
- one or more heating elements positioned adjacent to a pipe;
- an aerogel high temperature insulation layer adjacent to the one or more heating elements;
- a low temperature insulation layer adjacent to the aerogel high temperature insulation layer; and
  - a locking mechanism disposed over said low temperature layer, said locking mechanism configured to fix said pipe, said low temperature insulation layer and said aerogel high temperature insulation layer together such that longitudinal forces of said heat tracing device are transmitted between said pipe and said locking mechanism.

* * * * *